United States Patent
Kim et al.

(10) Patent No.: US 10,854,908 B2
(45) Date of Patent: Dec. 1, 2020

(54) ELECTRODE STRUCTURE AND LITHIUM BATTERY INCLUDING THE SAME

(71) Applicant: Samsung SDI Co., Ltd., Gyeonggi-do (KR)

(72) Inventors: Bo-Hyun Kim, Yongin-si (KR); Jong-Ki Lee, Yongin-si (KR); Hong-Jeong Kim, Yongin-si (KR); Yu-Jin Han, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 351 days.

(21) Appl. No.: 14/674,257

(22) Filed: Mar. 31, 2015

(65) Prior Publication Data
US 2015/0340730 A1    Nov. 26, 2015

(30) Foreign Application Priority Data

May 20, 2014  (KR) .................. 10-2014-0060491

(51) Int. Cl.
*H01M 10/052*    (2010.01)
*H01M 10/0587*    (2010.01)
(Continued)

(52) U.S. Cl.
CPC ....... *H01M 10/052* (2013.01); *H01M 2/1673* (2013.01); *H01M 2/18* (2013.01);
(Continued)

(58) Field of Classification Search
CPC ............. H01M 10/052; H01M 10/058; H01M 10/0587; H01M 2/1673; H01M 2/18;
(Continued)

(56) References Cited

U.S. PATENT DOCUMENTS 8,012,614 B2    9/2011  Nakashima et al.
8,129,049 B2 *  3/2012  Kim .................. H01M 10/0431
                                                    429/210

(Continued)

FOREIGN PATENT DOCUMENTS

CN    101941686    *  1/2011    ............. C01B 25/45
JP    2001-351672 A    12/2001
(Continued)

OTHER PUBLICATIONS

FNP (FNP 52 1992 Additive 006 {http://www.fao.org/ag/agn/jecfa-additives/specs/Monograph1/Additive-006.pdf}) taken as Dec. 1992.*

*Primary Examiner* — Jonathan G Leong
*Assistant Examiner* — Aaron J Greso
(74) *Attorney, Agent, or Firm* — Knobbe, Martens, Olson & Bear, LLP

(57) ABSTRACT

Provided are an electrode structure and a lithium battery including the same. The electrode structure may include a positive electrode, a negative electrode, and a first separator disposed between the positive electrode and the negative electrode, wherein the positive electrode and the negative electrode have active material layers having different loading levels. A lithium battery may have improved high rate characteristics and lifespan characteristics by including the electrode structure.

19 Claims, 5 Drawing Sheets

(51) Int. Cl.
| | |
|---|---|
| *H01M 2/16* | (2006.01) |
| *H01M 4/36* | (2006.01) |
| *H01M 4/525* | (2010.01) |
| *H01M 4/583* | (2010.01) |
| *H01M 4/13* | (2010.01) |
| *H01M 10/058* | (2010.01) |
| *H01M 2/18* | (2006.01) |
| *H01M 4/02* | (2006.01) |
| *H01M 4/131* | (2010.01) |
| *H01M 10/42* | (2006.01) |
| *H01M 4/133* | (2010.01) |

(52) U.S. Cl.
CPC ............ *H01M 4/13* (2013.01); *H01M 4/366* (2013.01); *H01M 4/525* (2013.01); *H01M 4/583* (2013.01); *H01M 10/058* (2013.01); *H01M 10/0587* (2013.01); *H01M 4/131* (2013.01); *H01M 4/133* (2013.01); *H01M 2004/021* (2013.01); *H01M 2010/4292* (2013.01); *Y02T 10/7011* (2013.01)

(58) Field of Classification Search
CPC ........ H01M 4/13; H01M 4/133; H01M 4/366; H01M 4/525; H01M 4/583; H01M 4/131; H01M 2004/021; Y02E 60/122
See application file for complete search history.

(56) References Cited

U.S. PATENT DOCUMENTS

| | | | |
|---|---|---|---|
| 2002/0034691 A1* | 3/2002 | Segawa | H01M 2/1673 429/306 |
| 2009/0075172 A1 | 3/2009 | Ando et al. | |
| 2009/0148759 A1* | 6/2009 | Mitsuda | H01G 9/058 429/142 |
| 2009/0263707 A1* | 10/2009 | Buckley | H01M 2/1653 429/94 |
| 2010/0104930 A1 | 4/2010 | Kim et al. | |
| 2011/0003203 A1* | 1/2011 | Seino | H01M 4/621 429/217 |
| 2011/0281175 A1* | 11/2011 | Hudson | H01M 4/13 429/312 |
| 2012/0003534 A1* | 1/2012 | Sheem | H01M 4/131 429/218.1 |
| 2012/0321948 A1* | 12/2012 | Oya | H01M 4/0404 429/211 |
| 2014/0050958 A1* | 2/2014 | Kwon | H01M 10/0583 429/94 |

FOREIGN PATENT DOCUMENTS

| | | | | |
|---|---|---|---|---|
| JP | 2002-151079 | * | 5/2002 | ............ H01M 4/58 |
| JP | 2005-166353 | * | 6/2005 | ............ H01M 10/05 |
| JP | 2009-070781 A | | 4/2009 | |
| JP | 2009-252349 A | | 10/2009 | |
| KR | 10-0963981 B | | 6/2010 | |
| WO | WO 2011/105126 | * | 9/2011 | ............ H01M 4/525 |

* cited by examiner

ELECTRODE STRUCTURE AND LITHIUM BATTERY INCLUDING THE SAME

RELATED APPLICATION

This application claims the benefit of Korean Patent Application No. 10-2014-0060491, filed on May 20, 2014, in the Korean Intellectual Property Office, the disclosure of which is incorporated herein in its entirety by reference.

BACKGROUND OF THE INVENTION

Field of the Invention

One or more embodiments of the present invention relate to an electrode structure and a lithium battery including the same.

Description of the Related Art

A lithium secondary battery generates electrical energy by an oxidation and reduction reaction according to intercalation/deintercalation of lithium ions while an electrolyte fills a space between the positive electrode and negative electrode including active materials capable of intercalation/deintercalation of lithium ions.

Particularly, the lithium secondary battery is manufactured by inserting an electrode structure into a battery case which is rectangular, cylindrical, or pouch-shaped and injecting an electrolyte solution. The electrode structure may be classified into a jelly-roll type and a stack type according to its structure, wherein the jelly-roll type has the wound structure formed by winding positive electrode and a negative electrode with a separator disposed between the positive electrode and the negative electrode, and the stack type has the stacked structure formed by sequentially stacking a plurality of positive electrodes, a plurality of negative electrodes, and a plurality of separators located therebetween one another in the stated order.

The lithium secondary battery has a high driving voltage and a high energy density per unit weight and may be miniaturized and manufactured to have a high capacity. Accordingly, the lithium secondary battery is generally used as energy sources in the field of small, high-technical electronic devices, such as digital cameras, mobile devices, laptops, and computers. Also, the lithium secondary battery is used as an energy source of an energy storage system (ESS) with high capacity and electronic cars (also known as xEVs), such as hybrid electric vehicles (HEVs), plug-in hybrid electric vehicles (PHEVs), and electric vehicles (EVs).

Therefore, a lithium battery having improved high rate characteristics and life characteristics, while still having the advantages of the lithium secondary battery, needs to be developed for application in various fields.

SUMMARY OF THE INVENTION

One or more embodiments of the present invention include an electrode structure that may improve rate characteristics and life characteristics of a lithium battery.

One or more embodiments of the present invention include a lithium battery including the electrode structure.

Additional aspects will be set forth in part in the description which follows and, in part, will be apparent from the description, or may be learned by practice of the presented embodiments.

According to one or more embodiments of the present invention, an electrode structure for a lithium battery includes a positive electrode; a negative electrode; and a first separator disposed between the positive electrode and the negative electrode, wherein the positive electrode comprises a positive electrode current collector; a first positive active material layer disposed on a first surface of the positive electrode current collector; and a second positive active material layer disposed on a second surface of the positive electrode current collector, and the negative electrode includes a negative electrode current collector; a first negative active material layer disposed on a first surface of the negative electrode current collector; and a second negative active material layer disposed on a second surface of the negative electrode current collector, wherein a loading level of the second positive active material layer in the electrode structure is higher than a loading level of the first positive active material layer, a loading level of the first negative active material layer is higher than a loading level of the second negative active material layer, and the second positive active material layer and the first negative active material layer are disposed near the first separator located therebetween.

The electrode structure may further include a second separator that is disposed on an outer surface of at least one selected from the first positive active material layer and the second negative active material layer.

The electrode structure may be a jelly-roll type or a stack type.

A ratio of the loading level of the second positive active material layer to the loading level of the first positive active material layer may be in a range of higher than 1 to about 4 or lower, and a ratio of the loading level of the first negative active material layer to the loading level of the second negative active material layer may be in a range of higher than 1 to about 4 or lower.

A ratio of a loading level of the second positive active material layer to a loading level of the first positive active material layer may be in a range of about 1.1 to about 2.5, and a ratio of a loading level of the first negative active material to a loading level of the second negative active material layer may be in a range of about 1.1 to about 2.5.

A ratio of the loading level of the second positive active material layer to the loading level of the first positive active material layer may be equal to a ratio of the loading level of the first negative active material layer to the loading level of the second negative active material layer.

The loading level of the first positive active material layer may be in a range of about 4 $mg/cm^2$ to about 40 $mg/cm^2$, and the loading level of the second negative active material layer may be in a range of about 2 $mg/cm^2$ to about 20 $mg/cm^2$.

A density of the first positive active material layer may be equal to a density of the second positive active material layer and a thickness of the second positive active material layer may be greater than a thickness of the first positive active material layer.

The density of each of the first positive active material layer and the density of the second positive active material layer may be in a range of about 3.0 g/cc to about 4.2 g/cc, a thickness of the first positive active material layer may be in a range of about 10 μm to about 110 μm, and a thickness of the second positive active material layer may be greater than 1 to about 4 or less times as thick as the thickness of the first positive active material layer.

A density of the first negative active material layer may be equal to a density of the second negative active material layer, and a thickness of the first negative active material layer may be greater than a thickness of the second negative active material layer.

The density of each of the first positive active material layer and the density of the second positive active material layer may be in a range of about 1.3 g/cc to about 1.8 g/cc, the thickness of the second negative active material layer may be in a range of about 15 µm to about 130 µm, and the thickness of the first negative active material layer may be greater than 1 to about 4 or less times as thick as the thickness of the second negative active material layer.

A thickness of the first positive active material layer may be equal to a thickness of the second positive active material layer, a density of the second positive active material layer may be higher than a density of the first positive active material layer, a thickness of the first negative active material layer may be equal to a thickness of the second negative active material layer, and a density of the first negative active material layer may be higher than a density of the second negative active material layer.

A porosity of the second positive active material layer and a porosity of the first positive active material layer may be different from each other, and a porosity of the first negative active material layer and a porosity of the second negative active material layer may be different from each other.

The porosity of the second positive active material layer may be greater than the porosity of the first positive active material layer and the porosity of the first negative active material layer may be greater than the porosity of the second negative active material layer.

A ratio of the porosity of the second positive active material layer to the porosity of the first positive active material layer may be in a range of about 1.1 to about 2.3, and a ratio of the porosity of the first negative active material layer to the porosity of the second negative active material layer may be in a range of about 1.1 to about 2.3.

A ratio of the porosity of the second positive active material layer to the porosity of the first positive active material layer may be equal to the ratio of the porosity of the first negative active material layer to the porosity of the second negative active material.

The porosity of the first positive active material may be in a range of about 15% to about 40%, and the porosity of the second negative active material layer may be in a range of about 15% to about 40%.

According to one or more embodiments of the present invention, a lithium battery includes the electrode structure.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION OF THE PREFERRED EMBODIMENT

Figure 1:
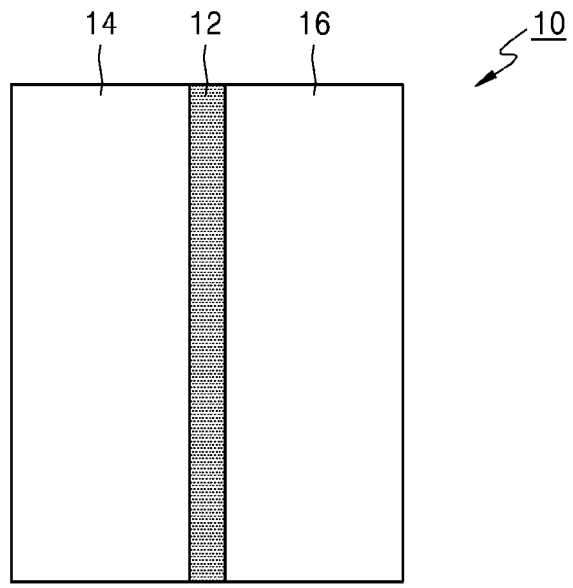
FIG. 1 is a schematic view of the general structure of a electrode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention. In the description of the present invention, certain detailed explanations of related art are omitted when it is deemed that they may unnecessarily obscure the essence of the invention. While such terms as "first," "second," etc., may be used to describe various components, such components must not be limited to the above terms. The above terms are used only to distinguish one component from another. The terms used in the present specification are merely used to describe particular embodiments, and are not intended to limit the present invention. An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, "/" may be construed, depending on the context, as referring to "and" or "or". As used herein, the term "and/or" includes any and all combinations of one or more of the associated listed items. Expressions such as "at least one of," when preceding a list of elements, modify the entire list of elements and do not modify the individual elements of the list.

In the drawings, the thicknesses of layers and regions are exaggerated for clarity. Like reference numerals in the drawings and specification denote like elements It will be understood that when an element, for example, a layer, a film, a region, or a substrate, is referred to as being "on" or "above" another element, it can be directly on the other element or intervening layers may also be present.

In general, when a positive electrode or a negative electrode is prepared, amounts of an active material per unit area coating two surfaces of a current collector are the same. Here, the amount of an active material per unit area is referred to as "a loading level", and the loading level is a factor independent from a roll press process.

FIG. 1 is a cross-sectional view schematically illustrating a general structure of an electrode 10. The electrode 10 may be a negative electrode or a positive electrode. Referring to FIG. 1, the electrode 10 has a structure including active material layers 14 and 16 with the same loading level on two surfaces of a current collector 12.

However, when the electrodes 10 (a negative electrode and a positive electrode) including the current collector 12, on which the active material layers 14 and 16 having the same loading level are disposed, is wound with a separator, a radius of curvature is small at a center of winding (a winding core), and thus surfaces of the active material layers 14 and 16 facing the winding core may have been crumpled or detached due to pressure generated by the winding. Also, since the surfaces of the active material layers 14 and 16 facing the winding core consume an electrolyte solution at a fast rate, loading levels of the active material layers 14 and 16 respectively formed on the two surfaces of the current collector 12 may be imbalanced, and thus, rate characteristics and life characteristics of the lithium battery may deteriorate.

In this regard, the present inventors prepared an electrode structure including an asymmetrical negative electrode and an asymmetrical positive electrode to improve rate characteristics and life characteristics of a lithium battery.

In particular, an electrode structure according to an embodiment of the present invention includes a positive electrode, a negative electrode, and a first separator disposed between the positive electrode and the negative electrode. The positive electrode includes a positive electrode current collector; a first positive active material layer disposed on a first surface of the positive electrode current collector; and a second positive active material layer disposed on a second surface of the positive electrode current collector, and the negative electrode includes a negative electrode current collector; a first negative active material layer disposed on a first surface of the negative electrode current collector; and a second negative active material layer disposed on a second surface of the negative electrode current collector. A loading level of the second positive active material layer is higher than a loading level of the first positive active material layer, and a loading level of the first negative active material layer is higher than a loading level of the second negative active material. The second positive active material layer and the first negative active material layer are disposed near the first separator located therebetween.

When a loading level of the second positive active material layer is higher than a loading level of the first positive active material layer and a loading level of the first negative active material layer is higher than a loading level of the second negative active material layer, a resistance of the lithium battery may decrease to less than that of a lithium battery in which active material layers have the same loading levels, and thus rate characteristics of the lithium battery in which active material layers have different loading levels may be improved.

The electrode structure may further include a second separator that is disposed on an outer surface of at least one selected from the first positive active material layer and the second negative active material layer. The first separator and the second separator may be identical to or different from each other.

The electrode structure may be a jelly-roll type or a stack type.

When the electrode structure is a jelly-roll type, for example, the second separator may be disposed on an outer surface of the second negative active material layer, and then a unit structure including the first positive active material layer/positive electrode current collector/second positive active material layer/first separator/first negative active material layer/negative electrode current collector/second negative active material layer/second separator that are stacked in the listed order may be wound such that the first surfaces of the positive electrode/negative electrode current collectors face a winding core of the wound electrode structure and the second surfaces of the positive electrode/negative electrode current collectors face the outside of the wound electrode structure.

Alternatively, when the electrode structure is a jelly-roll type, the unit structure having the second separator disposed on an outer surface of the second negative active material layer may be wound such that the second surfaces of the positive electrode/negative electrode current collectors face the winding core of the wound electrode structure and the first surfaces of the positive electrode/negative electrode current collectors face the outside of the wound electrode structure.

Alternatively, when the electrode structure is a jelly-roll type, the second separator may be disposed on an outer surface of the first positive active material layer, and then a unit structure including the second separator/first positive active material layer/positive electrode current collector/second positive active material layer/first separator/first negative active material layer/negative electrode current collector/second negative active material layer that are stacked in the listed order may be wound in a direction opposite to the winding direction described above.

When the electrode structure is a stack type, for example, the second separator may be disposed on an outer surface of the second negative active material layer, and then a plurality of unit structures may be stacked, each unit structure including a sequentially stacked structure of the first positive active material layer/positive electrode current collector/second positive active material layer/first separator/first negative active material layer/negative electrode current collector/second negative active material layer/second separator that are stacked in the listed order.

Alternatively, when the electrode structure is a stack type, the second separator may be disposed on an outer surface of the first positive active material, and then a plurality of unit structures may be stacked, each unit structure including a sequentially stacked structure of the second separator/first positive active material layer/positive electrode current collector/second positive active material layer/first separator/first negative active material layer/negative electrode current collector/second negative active material that are stacked in the listed order.

In the electrode structure, the active material layers having a high loading level (the second positive active material layer and the first negative active material layer) face each other and the active material layers having a small loading level (the first positive active material layer and the second negative active material layer) face each other. When the electrode structure has the structure above, positive active material layers and negative active material layers that face each other are balanced, and thus rate characteristics and life characteristics of the lithium battery may improve.

A ratio of a loading level of the second positive active material to a loading level of the first positive active material layer may be from 1 to about 4, and a ratio of a loading level of the first negative active material layer to a loading level of the second negative active material layer may be in a range of 1 to about 4.

For example, a ratio of a loading level of the second positive active material to a loading level of the first positive active material layer may be about 1.1 to about 2.5, and a ratio of a loading level of the first negative active material layer to a loading level of the second negative active material layer may be in a range of about 1.1 to about 2.5.

When the ratios are within these ranges above, resistance of an electrolyte solution in an electrode is lowered, and thus the electrode may have excellent electrochemical reactivity. Also, in the case of the jelly-roll type electrode structure, the first positive active material layer facing the winding core may not be crumpled or detached due to pressure. Moreover, when the first positive active material layer is disposed facing a winding core of the wound electrode structure, a capacity ratio of the positive electrode and the negative electrode (that is, a ratio of a negative electrode capacity/a positive electrode capacity, or, in other words, an N/P ratio), in particular, a capacity ratio with respect to a counter area of the positive electrode and the negative electrode is designed to be greater than 1, and thus a probability of lithium being deposited on the negative electrode may be small, and thus a battery that is excellent in safety may be manufactured.

The ratio of a loading level of the second positive active material to a loading level of the first positive active material layer may be the same as the ratio of a loading level of the first negative active material layer to a loading level of the second negative active material layer. Therefore, a capacity ratio of the positive active material layer and the negative active material layer facing the positive active material layer may be maintained within a range of about 1.05 to about 1.5 to prevent deposition of lithium that may be caused by imbalanced capacities of the positive electrode and the negative electrode facing each other.

The loading level of the first positive active material layer may be in a range of about 4 mg/cm$^2$ to about 40 mg/cm$^2$, and the loading level of the second positive active material layer may be controlled to be about 1.1 to about 2.5 times as high as a loading level of the first positive active material layer. The loading level of the second negative active material layer may be in a range of about 2 mg/cm$^2$ to about 20 mg/cm$^2$, and the loading level of the first negative active material layer may be controlled to be about 1.1 to about 2.5 times as high as a loading level of the second negative active material layer. When the loading levels are within these ranges, a battery may have high rate characteristics and improved lifespan characteristics, and an electrode structure may be easily wound.

The loading level may be changed by varying a density of an active material layer or a thickness of an active material layer. Here, the term "density of an active material layer" denotes a mass per volume of an active material layer which may be also addressed as a mixture density that refers to a degree that an electrode being pressed in a press-roll process.

For example, when the densities of the active material layers are the same, the active material layers may be thickly formed so that their loading levels are increased. Here, a ratio of a loading level of the first active material layer to a loading level of the second active material layer may be the same as a ratio of a thickness of the first active material layer to a thickness of the second active material layer.

Optionally, when the thicknesses of the active material layers are the same, the active material layers may be densely formed so that their loading levels are increased. Here, a ratio of a loading level of the first active material layer to a loading level of the second active material layer may be the same as a ratio of a density of the first active material layer to a density of the second active material layer.

According to an embodiment of the present invention, the density of the first positive active material layer may be the same as the second positive active material layer, and the thickness of the second positive active material layer may be greater than the thickness of the first active material layer.

For example, each of the densities of the first positive active material layer and the second positive active material layer may be in a range of about 3.0 g/cc to about 4.2 g/cc, the thickness of the first positive active material layer may be in a range of about 10 μm to about 110 μm, and the thickness of the second positive active material layer may be greater than 1 to about 4 or less times the thickness of the first positive active material layer. For example, the thickness of the second positive active material layer may be greater than about 1.1 to about 2.5 or less times the first positive active material layer.

According to an embodiment of the present invention, the densities of the first negative active material layer and the second negative active material layer are the same, and the thickness of the first negative active material layer may be greater than the thickness of the second negative active material layer.

For example, each of the densities of the first negative active material layer and the second negative active material layer may be in a range of about 1.3 g/cc to about 1.8 g/cc, the thickness of the second negative active material layer may be in a range of about 15 μm to about 130 μm, and the thickness of the first negative active material layer may be greater than 1 to about 4 or less times the thickness of the second negative active material layer. For example, the thickness of the first negative active material layer may be greater than about 1.1 to about 2.5 or less times the thickness of the second negative active material layer.

According to an embodiment of the present invention, the thicknesses of the first positive active material layer and the second positive active material layer are the same, the density of the second positive active material layer is higher than the density of the first positive active material layer, the thicknesses of the first negative active material layer and the second negative active material layer are the same, and the density of the first negative active material may be higher than the density of the second negative active material layer. The ranges of the thicknesses and densities of the first and second positive active material layers and the first and second negative active material layers are as defined above.

Figure 2A:
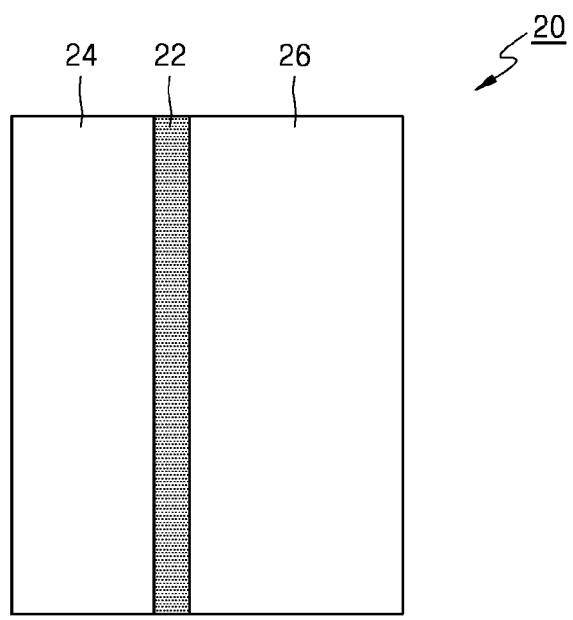
FIG. 2A is a schematic view of a positive electrode according to an embodiment of the present invention.
Figure 2B:
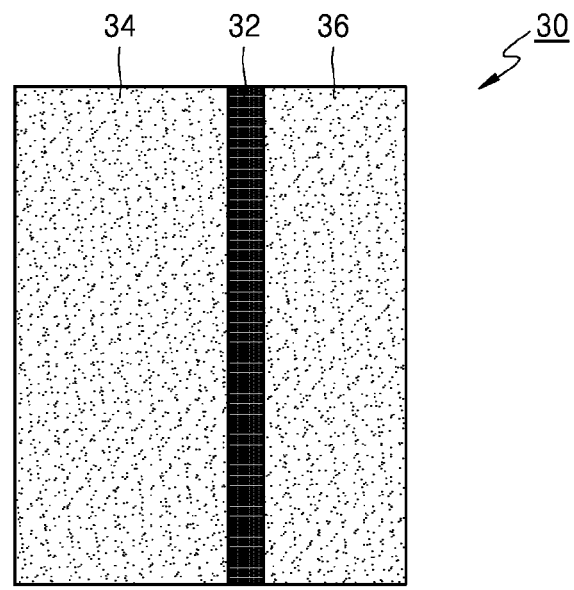
FIG. 2B is a schematic view of a negative electrode according to an embodiment of the present invention.

FIG. 2A is a schematic view of a positive electrode according to an embodiment of the present invention, and FIG. 2B is a schematic view of a negative electrode according to an embodiment of the present invention.

Referring to FIG. 2A, a positive electrode 20 includes a positive electrode current collector 22; a first positive active material layer 24 disposed on a first surface of the positive electrode current collector 22; and a second positive active material layer 26 disposed on a second surface of the positive electrode current collector 22. When densities of the first positive active material layer 24 and the second positive active material layer are the same, as shown in FIG. 2A, the second positive active material layer 26 is formed thicker than the first positive active material layer 24 so that a loading level of the second positive active material layer 26 is higher than a loading level of the first positive active material layer 24.

Referring to FIG. 2B, a negative electrode 30 includes a negative electrode current collector 32; a first negative active material layer 34 disposed on a first surface of the negative electrode current collector 32; and a second negative active material layer 36 disposed on a second surface of the negative electrode current collector 32. In like manner, when the densities of the first negative active material layer 34 and the second negative active material layer 36 are the same, the first negative active material layer 34 may be formed thicker than the second negative active material layer 36 so that a loading level of the first negative active material layer 34 is higher than a loading level of the second negative active material layer 36.

A resistance of an electrolyte solution in the positive electrode 20 or the negative electrode 30 may be represented by Equation 1 below:

$$R = \rho L \tau / A \varepsilon \qquad \text{<Equation 1>}$$

(Here, $\rho$=a specific resistance, L=a thickness of an active material layer, $\tau$=a degree of curvature, A=an area of an electrode, and $\varepsilon$=a porosity)

Here, as shown in FIG. 1, in the case of the positive electrode (hereinafter, also referred to as "a symmetrical positive electrode") in which the active material layers respectively disposed on two surfaces of the current collector have thicknesses (L) that are the same as each other, a resistance of the electrolyte solution in the symmetrical positive electrode may be represented by Equation 2 below:

$$R = \rho L \tau / 2 A \varepsilon \qquad \text{<Equation 2>}$$

(Here, $\rho$=a specific resistance, L=a thickness of an active material layer, $\tau$=a degree of curvature, A=an area of an electrode, and $\varepsilon$=a porosity)

On the other hand, as shown in FIG. 2A, a thickness (L1) of the first positive active material layer disposed on one surface of a current collector is smaller than a thickness (L2) of the second positive active material layer, and densities of the first positive active material layer and the second positive active material are the same, and thus, when a loading level of the first positive active material layer is smaller than a loading level of the second positive active material layer in the positive electrode (hereinafter, also referred to as "an asymmetrical positive electrode"), a resistance of an electrolyte solution in the asymmetrical positive electrode may be represented by Equation 3 below, and a resistance ratio of the asymmetrical positive electrode to the symmetrical positive electrode (hereinafter, also referred to as "a resistance ratio") according to a ratio of a loading level of the first positive active material layer to a loading level of the second positive active material layer (hereinafter, also referred to as "an asymmetry degree") may be represented by Equation 3:

$$R = \rho L1 L2 \tau / (L1+L2) A \varepsilon \qquad \text{<Equation 3>}$$

(Here, 2L=L1+L2, $\rho$=a specific resistance, L=a thickness of a positive active material layer, L1=a thickness of a first positive active material layer, L2=a thickness of a second positive active material layer, $\tau$=a degree of curvature, A=an area of an electrode, $\varepsilon$=a porosity)

Figure 3:
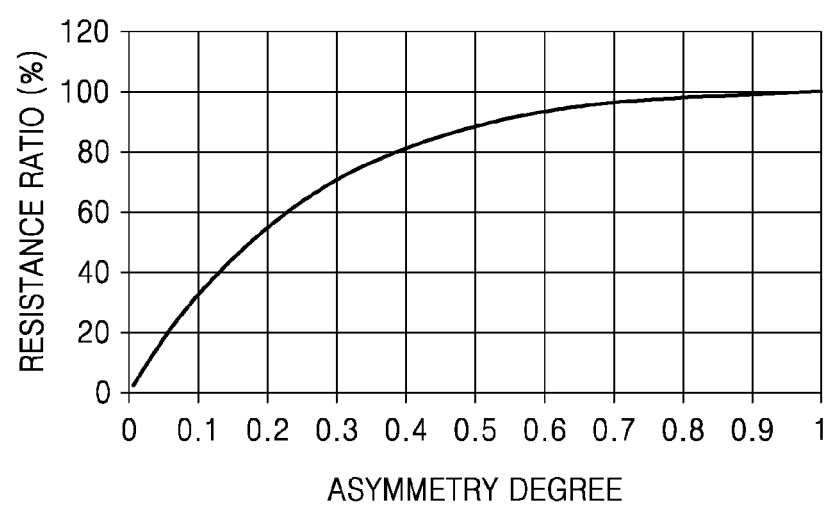
FIG. 3 is a graph illustrating a resistance ratio of an asymmetrical positive electrode to a symmetrical positive electrode (hereinafter, also referred to as "resistance ratio") per ratio of loading level of a first positive active material layer to a loading level of a second positive active material layer (hereinafter, also referred to as "asymmetry degree"), according to an embodiment of the present invention.

Therefore, as shown in FIG. 3, it may be known that, besides other factors that may change a resistance of a battery, a resistance of an electrolyte solution in the asymmetrical positive electrode is lower than a resistance of an electrolyte solution in the symmetrical positive electrode, and when a degree of asymmetry decreases, that is, when a difference of the loading levels increases, a resistance value of the electrolyte solution in the asymmetrical positive electrode decreases.

In particular, when a degree of asymmetry is about 0.4 (a ratio of a loading level of the second positive active material layer to a loading level of the first positive active material layer is 2.5), a resistance of the electrolyte solution in the asymmetrical positive electrode may decrease to about 80% of a resistance of the electrolyte solution in the symmetrical positive electrode. Thus, it may be estimated that the asymmetrical positive electrode may have a lower resistance of the electrolyte solution compared to that of the symmetrical positive electrode.

The same resistance data of the electrolyte solution in the asymmetrical positive electrode may be applied to the negative electrode similar to the above manner.

Figure 4:
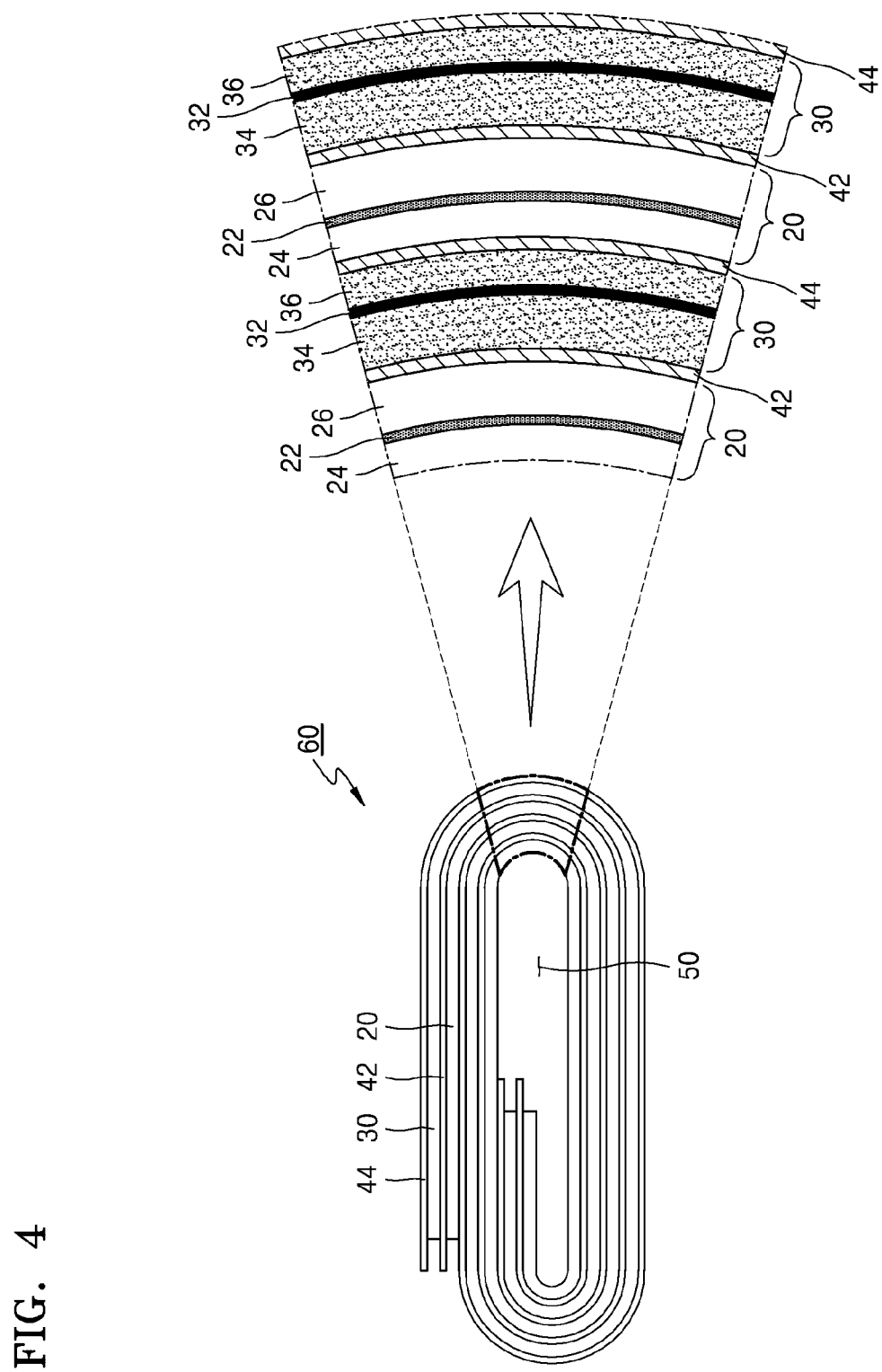
FIG. 4 is a cross-sectional view of an electrode structure of a jelly-roll type according to an embodiment of the present invention.

FIG. 4 is a cross-sectional view of a jelly-roll type electrode structure, according to an embodiment of the present invention, and the drawing on the right side is an exaggerated view of a portion of the cross-sectional surface of the electrode structure.

Referring to FIG. 4, an electrode structure 60 of a jelly-roll type may include a structure that includes a positive electrode 20, a first separator 42, a negative electrode 30, and a second separator 44 that are sequentially stacked and wound. In order to avoid contact between the positive electrode 20 and the negative electrode 30 while winding the electrode structure 60, lengths of the first separator 42 and the second separator 44 may be formed longer than those of the positive electrode 20 and the negative electrode 30.

In particular, the first positive active material layer and the first negative active material layer are disposed on the first surface of the current collector, that is, a surface facing a winding core of the wound electrode structure 60, and the second positive active material layer and the second negative active material layer are disposed on the second surface of the current collector, that is, a surface facing the outside of the wound electrode structure 60. More particularly, the electrode structure 60 may have a structure including the first positive active material layer 24/positive electrode current collector 22/second positive active material layer 26/first separator 42/first negative active material layer 34/negative electrode current collector 32/second negative active material layer 36/second separator 44 that are repeatedly stacked in the listed order when viewed from the winding core 50 in a direction toward the outside of the electrode structure 60.

Therefore, the second positive active material layer 26 having a high loading level may be disposed facing the first negative active material layer 34 having a high loading level with the first separator 42 located therebetween, and the second negative active material layer 36 having a low loading level may be disposed facing the first positive active material layer 24 having a low loading level with the second separator 44 located therebetween.

As shown in FIG. 4, when viewed from the winding core 50 in a direction toward the outside of the electrode structure 60, the negative electrode 30 may have an area that is larger than that of the positive electrode 20 facing the negative electrode 30 as a radius of curvature increases, and thus an N/P ratio may be stabilized.

Figure 5:
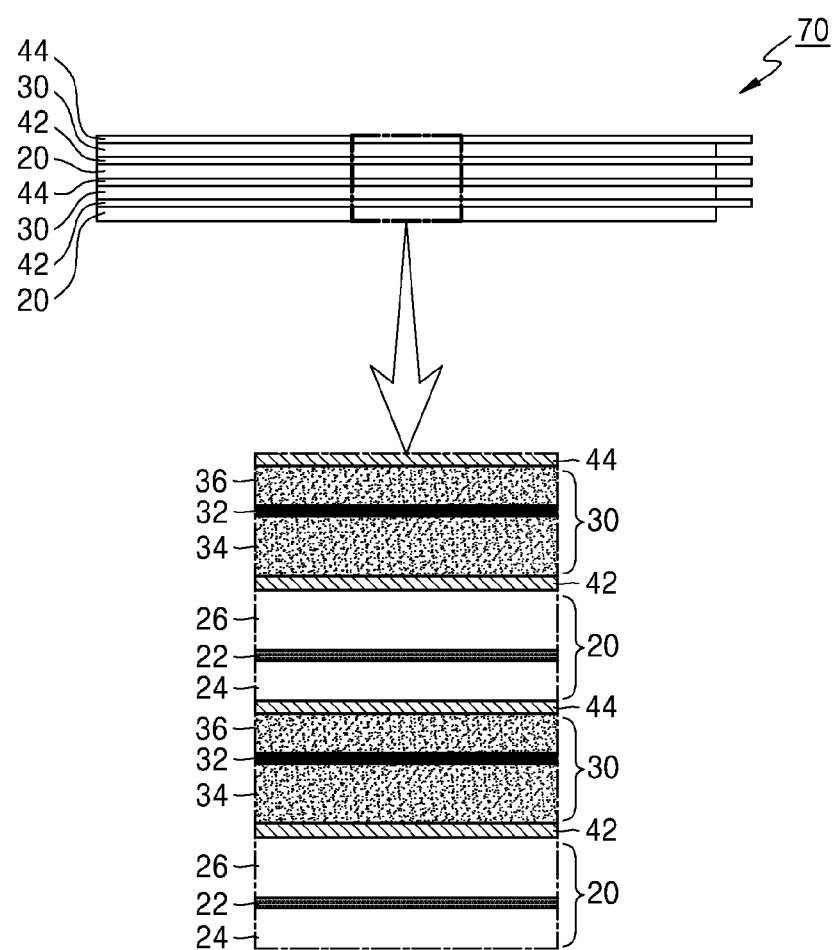
FIG. 5 is a cross-sectional view of an electrode structure of a stack type according to an embodiment of the present invention.

FIG. 5 is a cross-sectional view of an electrode structure of a stack type according to an embodiment of the present invention, and the drawing at the lower part is an exaggerated view of a portion of the cross-section.

Referring to FIG. 5, an electrode structure 70 of a stack type may have a structure including the positive electrode 20, the first separator 42, the negative electrode 30, and the second separator 44 that are sequentially stacked in the listed order. The electrode structure 70 of a stack type may include a plurality of the structures that are stacked on one another.

In particular, the electrode structure 70 may have a structure including the first positive active material layer 24/positive electrode current collector 22/second positive active material layer 26/first separator 42/first negative active material layer 34/negative electrode current collector 32/second negative active material layer 36/second separator 44 that are repeatedly stacked in the listed order, and the electrode structure 70 may include a plurality of the structures.

Therefore, the second positive active material layer 26 having a high loading level may be disposed facing the first negative active material layer 34 having a high loading level with the first separator 42 located therebetween, and the second negative active material layer 36 having a low loading level may be disposed facing the first positive active material layer 24 having a low loading level with the second separator 44 located therebetween.

According to an embodiment, a porosity of the second positive active material layer and a porosity of the first positive active material layer may be different from each other, and a porosity of the first negative active material layer and a porosity of the second negative active material layer may be different from each other.

Here, the term "porosity" refers to a percentage ratio of a volume of pores to the volume of the entire active material and is the same as a degree of pore. Porosity may be influenced by a particle packing density, a particle shape, particle distribution, or the like.

The porosity of the second positive active material layer may be greater than the porosity of the first positive active material layer, and the porosity of the first negative active material layer may be greater than the porosity of the second negative active material layer.

Since a loading level of the second positive active material layer is higher than a loading level of the first positive active material layer, when a porosity of a layer where a loading level is high increases, a resistance of the electrolyte solution may decrease. Thus, when an energy density per weight for a battery using the positive active material layers according to above embodiment is the same as that of a battery not using the positive active material layers according to above embodiment, a power density of the battery using the positive active material layers according to above embodiment may be higher than that of the battery not using the positive active material layers according to above embodiment. Also, since a loading level of the first negative active material layer is higher than a loading level of the second negative active material layer, a possibility of lithium being deposited on a surface of the negative electrode decreases as a porosity of a layer where a loading level is high increases, and thus a lifespan of the battery may improve.

For example, a ratio of a porosity of the second positive active material layer to a porosity of the first positive active material layer may be in a range of about 1.1 to about 2.3, and a ratio of a porosity of the first negative active material layer to a porosity of the second negative active material layer may be in a range of about 1.1 to about 2.3.

The ratio of a porosity of the second positive active material layer to a porosity of the first positive active material layer and the ratio of a porosity of the first negative active material layer to a porosity of the second negative active material layer may be the same.

A porosity of the first positive active material layer may be in a range of about 15% to about 40%, and a porosity of the second negative active material layer may be in a range of about 15% to about 40%. For example, a porosity of the first positive active material layer may be in a range of about 15% to about 20%, and a porosity of the second negative active material layer may be in a range of about 15% to about 20%. When the porosities are within these ranges, an excellent impregnation property of the electrolyte solution and an active material layer of a high density may be realized.

According to another embodiment of the present invention, a lithium battery includes the electrode structure described above.

Hereinafter, a method of preparing the lithium battery will be described.

First, a positive electrode may be prepared as follows.

A positive active material composition may be prepared by dispersing a positive active material, a binder, and, optionally, a conducting agent in a solvent. In this case, the solvent may be N-methylpyrrolidone (NMP), acetone, or water. An amount of the solvent may be about 1 part to about 400 parts by weight based on 100 parts by weight of the positive active material. When the amount of the solvent is within this range, an active material layer may be easily formed.

Then, two surfaces of a positive electrode current collector are coated with the positive active material composition, where one of the surfaces is coated with the composition at a higher loading level than that of the other surface. The coating may be performed by directly coating the current collector with the positive active material composition; or by casting the positive active material composition on a separate support and then laminating the current collector with a positive active material film detached from the support.

Next, the current collector coated with the positive active material composition is dried and pressed so that a second positive active material layer having a loading level that is higher than a loading level of a first positive active material layer is disposed on each of the two surfaces of the positive electrode current collector, thereby completing preparation of a positive electrode.

Next, a negative electrode may be prepared as follows.

A negative active material composition may be prepared by dispersing a negative active material, a binder, and, optionally, a conducting agent in a solvent. The solvent may be the same one used in the preparation of the positive electrode.

Then, two surfaces of a negative electrode current collector are coated with the negative active material composition, where one of the surfaces is coated with the composition at a higher loading level than that of the other surface. The coating may be performed by directly coating the negative active material composition on the current collector; or by casting the negative active material composition on a separate support and then laminating a negative active material film detached from the support on the current collector.

Next, the current collector coated with the negative active material composition is dried and pressed so that a first negative active material layer and a second negative active material layer having a loading level that is lower than a loading level of a first negative active material layer are respectfully disposed on the two surfaces of the negative electrode current collector, thereby completing preparation of a negative electrode.

The loading levels may be controlled by changing a density of the active material layer or a thickness of the active material layer.

For example, when densities of the active material layers are the same, a thickness of the active material layer may be increased to increase a loading level of the active material layer.

For example, when thicknesses of the active material layers are the same, a density of the active material layer may be increased to increase a loading level of the active material layer. The density of the active material layer may be controlled by changing a temperature of a pressing roll when using the pressing roll to press the two surfaces of the current collector.

In one embodiment, in order to prepare a lithium battery, in which a porosity of the second positive active material layer and a porosity of the first positive active material layer are different from one another and a porosity of the first negative active material layer and a porosity of the second negative active material layer are different from one another, the positive electrode current collector may be coated with the first and second positive active material compositions so that the first positive active material layer and the second positive active material layer having a higher loading level and a different porosity compared to the first positive active material layer are respectfully disposed on the two surfaces of the positive electrode current collector in the formation of the positive electrode. Also, the negative electrode current collector may be coated with the first and second negative active material compositions so that the first negative active material layer and the second negative active material layer having a lower loading level and a different porosity compared to the first negative active material layer are respectfully disposed on the two surfaces of the negative electrode current collector in the formation of the negative electrode.

In one embodiment, in order to prepare a lithium battery, in which a porosity of the second positive active material layer is higher than a porosity of the first positive active material layer and a porosity of the first negative active material layer is higher than a porosity of the second negative active material layer, the positive electrode current collector may be coated with the first and second positive active material compositions so that the first positive active material layer and the second positive active material layer having a higher loading level and a higher porosity compared to the first positive active material layer are respectfully disposed on the two surfaces of the positive electrode current collector in the formation of the positive electrode. Also, the negative electrode current collector may be coated with the first and second negative active material compositions so that the first negative active material layer and the second negative active material layer having a lower loading level and a lower porosity compared to the first negative active material layer are respectfully disposed on the two surfaces of the negative electrode current collector in the formation of the negative electrode.

The porosity may be controlled by changing an amount of the solvent of the active material compositions coating the two surfaces of the current collector or by changing a pressure applied onto the current collector, for example, by changing a temperature of a pressing roll when pressing each of the two surfaces of the current collector.

The positive active material may be any material generally available as a positive active material in the art. For example, the positive active material may be formed of a compound represented by one of formulae, $Li_aA_{1-b}B_bD_2$ (where, $0.90 \le a \le 1$ and $0 \le b \le 0.5$); $Li_aE_{1-b}B_bO_{2-c}D_c$ (where, $0.90 \le a \le 1$, $0 \le b \le 0.5$, and $0 \le c \le 0.05$); $LiE_{2-b}B_bO_{4-c}D_c$ (where, $0 \le b \le 0.5$ and $0 \le c \le 0.05$); $Li_aNi_{1-b-c}Co_bB_cD_\alpha$ (where, $0.90 \le a \le 1$, $0 \le b \le 0.5$, $0 \le c \le 0.05$, and $0 \le \alpha \le 2$); $Li_aNi_{1-b-c}Co_bB_cO_{2-\alpha}F_\alpha$ (where, $0.90 \le a \le 1$, $0 \le b \le 0.5$, $0 \le c \le 0.05$, and $0 \le \alpha \le 2$); $Li_aNi_{1-b-c}Co_bB_cO_{2-\alpha}F_2$ (where, $0.90 \le a \le 1$, $0 \le b \le 0.5$, $0 \le c \le 0.05$, and $0 < \alpha < 2$); $Li_aNi_{1-b-c}Mn_bB_cD_\alpha$ (where, $0.90 \le a \le 1$, $0 \le b \le 0.5$, $0 \le c \le 0.05$, and $0 \le \alpha \le 2$); $Li_aNi_{1-b-c}Mn_bB_cO_{2-\alpha}F_\alpha$ (where, $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (where, $0.90 \le a \le 1$, $0 \le b \le 0.5$, $0 \le c \le 0.05$, and $0 < \alpha < 2$); $Li_aNi_bE_cG_dO_2$ (where, $0.90 \le a \le 1$, $0 \le b \le 0.9$, $0 \le c \le 0.5$, and $0.001 \le d \le 0.1$); $Li_aNi_bCo_cMn_dGeO_2$ (where, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (where, $0.90 \le a \le 1$ and $0.001 \le b \le 0.1$); $Li_aCoG_bO_2$ (where, $0.90 \le a \le 1$ and $0.001 \le b \le 0.1$); $Li_aMnG_bO_2$ (where, $0.90 \le a \le 1$ and $0.001 \le b \le 0.1$); $Li_aMn_2G_bO_4$ (where, $0.90 \le a \le 1$ and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (where, $0 \le f \le 2$); $Li_{(3-f)}Fe_2(PO_4)_3$ (where, $0 > f > 2$); and $LiFePO_4$.

In the formulae above, A is nickel (Ni), cobalt (Co), manganese (Mn), or a combination thereof; B is aluminium (Al), Ni, Co, Mn, chromium (Cr), iron (Fe), Mg, strontium (Sr), vanadium (V), a rare earth metal element, or a combination thereof; D is oxygen (O), fluorine (F), sulfur (S), phosphorus (P), or a combination thereof; E is Co, Mn, or a combination thereof; F is F, S, P, or a combination thereof; G is Al, Cr, Mn, Fe, Mg, lanthanum (La), cerium (Ce), Sr, V, or a combination thereof; Q is Ti, molybdenum (Mo), Mn, or a combination thereof; I is Cr, V, Fe, Sc, Y, or a combination thereof; and J is V, Cr, Mn, Co, Ni, Cu, or a combination thereof.

For example, examples of the positive active material may include a compound represented by $LiCoO_2$, $LiMn_xO_{2x}$ (where, x is 1 or 2), $LiNi_{1-x}Mn_xO_{2x}$ (where, $0<x<1$), $LiNi_{1-x-y}Co_xMn_yO_2$ (where, $0 \le x \le 0.5$ and $0 \le y \le 0.5$), or $FePO_4$.

The negative active material may be any material generally available as a negative active material of a lithium battery in the art. For example, the negative active material may be at least one selected from the group consisting of lithium, a lithium-alloyable metal, a transition metal oxide, a non-transition metal oxide, and a carbonaceous material.

For example, the lithium-alloyable metal may be at least one selected from silicon (Si), tin (Sn), aluminium (Al), gallium (Ge), lead (Pb), bismuth (Bi), antimony (Sb), a Si—Y alloy (where, Y is an alkali metal, an alkali earth metal, a Group 13 element, a Group 14 element, a transition metal, a rare-earth element, or a combination thereof, wherein Y is not Si), or a Sn—Y alloy (where, Y is at least one selected from an alkali metal, an alkali earth metal, a Group 13 element, a Group 14 element, a transition metal, a rare-earth element, or a combination thereof, wherein Y is not Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

Examples of the transition metal oxide may include a lithium titanium oxide, a vanadium oxide, and a lithium vanadium oxide.

For example, the non-transition metal oxide may be $SnO_2$ or $SiO_x$ (where, $0<x<2$).

Examples of the carbonaceous material include crystalline carbon, amorphous carbon, and a mixture thereof. Examples of the crystalline carbon are graphite, such as natural graphite that is in amorphous, plate, flake, spherical or fibrous form or artificial graphite. Examples of the amorphous carbon include soft carbon (carbon sintered at low temperatures), hard carbon, meso-phase pitch carbides, and sintered cork.

A binder used in the preparation of the positive electrode and/or the negative electrode may be selected from polyvinylidene fluoride (PVdF), polyvinylidene chloride, polybenzimidazole, polyimide, polyvinylacetate, polyacrylonitrile, polyvinyl alcohol, a carboxymethyl cellulose (CMC), starch, hydroxypropyl cellulose, reproduced cellulose, polyvinylpyrrolidone, teterafluoroethylene, polyethylene, polypropylene, polystyrene, polymethylmethacrylate, polyaniline, acrylonitrile butadiene styrene, a phenolic resin, an epoxy resin, polyethylene terephthalate, polyteterafluoroethylene, polyphenylsulfide, polyamide imide, polyether imide, polyethylene sulfone, polyamide, polyacetal, a polyphenylene oxide, polybutylene terephthalate, a ethylene-propylene-diene monomer (EPDM), sulfonated EPDM, styrene butadiene rubber (SBR), fluorine rubber, and a combination thereof, but the binder is not limited thereto. An amount of the binder may be in a range of about 1 part to about 50 parts by weight, for example, about 1 part to about 30 parts by weight, about 1 part to about 20 parts by weight, or about 1 part to about 15 parts by weight, based on 100 parts by weight of the total amount of metal nanoparticles, a carbonaceous material, and a titanium-containing oxide that may serve as the negative active material. The binder may contribute to binding the metal nanoparticles and the current collector, binding the titanium-containing oxide and the current collector, or binding the metal nanoparticles and the conducting agent.

The conducting agent used in the preparation of the positive electrode and/or the negative electrode may be any material that is generally available as a conducting agent for a lithium battery in the art. Examples of the conducting agent may include a carbon-based material such as carbon black, graphite particulates, natural graphite, artificial graphite, acetylene black, ketjen black, and carbon fibers; a metal-based material such as metal powder or metal fibers of copper, nickel, aluminum, or silver; and a conductive polymer such as polyphenylene derivatives or a mixture thereof. An amount of the conducting agent may be controlled to be appropriate in the preparation of the positive electrode and/or the negative electrode. For example, a weight ratio of the positive active material or negative active material to the conducting agent may be in a range of about 99:1 to about 90:10. The conducting agent may provide a conductive pathway to the metal nanoparticles, the carbonaceous material, and the titanium-containing oxide to improve electric conductivity of the electrode.

In the positive electrode and/or negative electrode, the positive electrode or negative electrode current collector is not particularly limited and may be any material that has conductivity and does not cause chemical changes in a battery. For example, the positive electrode or negative electrode current collector may be formed of at least one material selected from aluminum, copper, nickel, titanium, and stainless steel that is surface-treated with carbon, nickel, titanium, or silver, and aluminum-cadmium alloys.

In addition, the positive electrode or negative electrode current collector may have fine irregularities on surfaces thereof so as to enhance adhesive strength of the current collector to the positive or negative active material, and may be used in any of various forms including films, sheets, foils, nets, porous structures, foams, and non-woven fabrics. In order to be to be used as a substrate, a surface of the material such as aluminum, copper, nickel, or stainless steel may be surface-treated with a coating component, such as nickel, copper, aluminum, titanium, gold, silver, or platinum, palladium, by electroplating or performing ion-deposition or the surface of the material may be coated with nanoparticles of the coating component by using a dip or compression method. Also, the current collector may be constructed of a base formed of a non-conductive material that is coated with a conductive material, which is selected from the conductive materials above.

The current collector may have fine irregularities on surfaces thereof, and the irregularities may enhance adhesive strength of the current collector to the positive or negative active material layer that will be coated on the substrate. The current collector may be used in any of various forms including films, sheets, foils, nets, porous structures, foams, and non-woven fabrics. A thickness of the current collector may be in a range of about 3 μm to about 500 μm.

Next, a separator may be disposed between the positive electrode and the negative electrode, thereby completing preparation of an electrode structure.

The electrode structure of a jelly-roll type may be prepared as follows. For example, a unit structure including the positive electrode, the first separator, the negative electrode, and the second separator that are sequentially stacked, or a unit structure including the second separator, the negative electrode, the first separator, and the positive electrode that are sequentially stacked may be wound to prepare the electrode structure of a jelly-roll type.

Alternatively, a unit structure including the second separator, the positive electrode, the first separator, and the negative electrode that are sequentially stacked, or a unit structure including the negative electrode, the first separator, the positive electrode, and the second separator that are sequentially stacked may be wound to prepare the electrode structure of a jelly-roll type.

The electrode structure of a stack type may be prepared as follows.

For example, a plurality of unit structures, each of the unit structures including the positive electrode, the first separator, the negative electrode, and the second separator that are sequentially stacked, or a plurality of unit structures, each of the unit structures including the second separator, the negative electrode, the first separator, and the positive electrode that are sequentially stacked, may be wound to prepare the electrode structure of a stack type.

Alternatively, a plurality of unit structures, each of the unit structures the second separator, the positive electrode, the first separator, and the negative electrode that are sequentially stacked, or a plurality of unit structures, each of the unit structures including the negative electrode, the first separator, the positive electrode, and the second separator that are sequentially stacked, may be wound to prepare the electrode structure of a stack type.

The first separator and the second separator may be any separator available for a lithium battery in the art. In particular, the separator may be low resistant with respect to ion transport of an electrolyte solution and excellent in electrolyte solution impregnating ability. Examples of a material for the separator may include glass fiber, polyester, Teflon, polyethylene, polypropylene, polytetrafluoroethylene (PTFE), and a combination thereof, each of which may be a nonwoven fabric or a woven fabric. The separator may have a pore diameter of about 0.01 μm to about 10 μm. The separator may have a thickness of about 5 μm to about 300 μm.

Next, the electrode structure is inserted into a battery case, and thus a lithium battery is prepared.

In particular, the electrode structure may be pressed into a shape that may be accommodated in a battery case having a box, a cylinder, or a pouch shape and then inserted into the battery case. Thereafter, an electrolyte may be injected through an injection port of the battery case, and thus manufacture of the lithium battery may be completed.

The electrolyte may be formed of a non-aqueous electrolyte and a lithium salt. Examples of the non-aqueous electrolyte may include a non-aqueous electrolyte solution, an organic solid electrolyte, and an inorganic solid electrolyte.

Examples of the non-aqueous electrolyte solution may include N-methyl-2-pyrrolidinone, propylene carbonate (PC), ethylene carbonate (EC), butylene carbonate, dimethyl carbonate (DMC), diethyl carbonate (DEC), ethylmethyl carbonate (EMC), gamma-butyrolactone (GBL), 1,2-dimethoxy ethane (DME), tetrahydrofuran (THF), 2-methyl tetrahydrofuran, dimethylsulfoxide (DMSO), 1,3-dioxolane (DOL), formamide, dimethylformamide, acetonitrile, nitromethane, methyl formate, methyl acetate, trimester phosphate, trimethoxy methane, a dioxolane derivative, sulfolane, methyl sulfolane, 1,3-dimethyl-2-imidazolidinone, a propylene carbonate derivative, a tetrahydrofuran derivative, and an aprotic organic solvent such as ether, methyl propionate, or ethyl propionate.

Examples of the organic solid electrolyte may include a polyethylene derivative, a polyethylene oxide derivative, a polypropylene oxide derivative, an ester phosphate polymer, poly agitation lysine, polyester sulfide, polyvinyl alcohol, polyfluoride vinylidene, and a polymer containing an ionic dissociable group.

The inorganic solid electrolyte may be, for example, a nitride, halide, or sulfate of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any one of various materials that are conventionally used in lithium batteries. As a material that is easily dissolved in the non-aqueous electrolyte, for example, at least one of LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lithium lower aliphatic carbonic acid, lithium 4 phenyl borate, and imide may be used.

Also, vinylene carbonate (VC) or catechol carbonate (CC) may be included in the electrolyte solution to form and maintain an SEI layer on a surface of the negative electrode. Optionally, the electrolyte may include a redox-shuttle type additive, such as n-butylferrocene or halogen-substituted benzene, to prevent overcharging of a battery. Optionally, the electrolyte may include an additive, such as cyclohexyl benzene or biphenyl, for forming a coating film. Optionally, the electrolyte may include a cation receptor, such as a crown ether-based compound, or an anion receptor, such as a boron-based compound, to improve conductivity characteristics of the electrolyte. Optionally, the electrolyte may include a phosphate-based compound, such as trimethylphosphate (TMP), tris(2,2,2-trifluoroethyl)phosphate (TFP), or hexamethoxycyclotriphosphazene (HMTP), as a flame retardant.

If needed, the electrolyte may include an additive such as tris(trimethylsilyl)phosphate (TMSPa), lithium difluorooxalatoborate (LiFOB), propanesultone (PS), succinonitrile (SN), $LiBF_4$, a silane compound having a functional group that may form a siloxane bond with, for example, acryl, amino, epoxy, methoxy, ethoxy, or vinyl, and a silazane compound such as hexamethyldisilazane to aid formation of a stable SEI layer or a coating film on a surface of the electrode and thus to improve stability of a battery. In particular, examples of the additive may be propanesultone (PS), succinonitrile (SN), or $LiBF_4$.

For example, a lithium salt, such as $LiPF_6$, $LiClO_4$, $LiBF_4$, or $LiN(SO_2CF_3)_2$, may be added to a mixture solvent including a high dielectric solvent, which is a cyclic carbonate, such as EC or PC, and a low viscosity solvent, which is a linear carbonate, such as DEC, DMC, or EMC to prepare an electrolyte.

The lithium battery may be used in a battery that is used as a power source of a miniaturized device or may be used as a unit battery of a mid or large-sized device battery module including a plurality of batteries.

Examples of the middle or large-sized device may include a power tool; an xEV, such as an electric vehicle (EV), a hybrid electric vehicle (HEV), or a plug-in hybrid electric vehicle (PHEV); an electric motorcycle, such as an E-bike or an E-scooter; an electric golf cart; an electric truck; an electric commercial vehicle; and an electric power storage system, but are not limited thereto. Also, the lithium battery may be used in applications requiring a high-power output, a high voltage, and high temperature operability.

Hereinafter, the present invention will be described in further detail with reference to the following examples. These examples are for illustrative purposes only and are not intended to limit the scope of the present invention.

(Preparation of Lithium Secondary Battery)

Example 1

1) Preparation of Positive Electrode

To prepare a positive active material composition, $LiCoO_2$ (available from Umicore Korea Limited, located in Cheonan, Korea) having an average particle diameter of 10 μm as a positive active material, Denka Black (available from Denka Singapore Private LTD, located in Quay, Singapore) as a conducting agent, and polyvinylidene fluoride (PVDF) as a binder were added at a weight ratio of 97.45:1.2:1.35, and a solvent, N-methylpyrrolidone, was added to control viscosity so that an amount of solid content in the mixture is 60 wt %.

By using a conventional method, two surfaces of an aluminum current collector having a thickness of 15 μm were coated with the positive active material composition, thereby resulting in positive active material layers having different thicknesses from each other. Then, the current collector coated with the positive active material composition was dried at a room temperature, dried again and pressed at a temperature of 120° C. to prepare a positive electrode including a first positive active material layer having a thickness of 53 μm, a density of 3.96 g/cc, a loading level of 21.07 mg/cm², and a porosity of 19%, and a second positive active material layer having a thickness of 65 μm, a density of 3.96 g/cc, a loading level of 25.75 mg/cm², and a porosity of 19%, on respective surfaces of the aluminum current collector.

2) Preparation of Negative Electrode

To prepare a negative active material composition, graphite (available from BTR NEW ENERGY MATERIAL INC, located in Tianjin, China) having an average particle diameter of 20 μm as a negative active material was mixed with styrene butadiene rubber (SBR) (available from Zeon Co., located in Tokyo, Japan), as a binder, and carboxymethylcellulose (CMC) (available from Nippon Paper Chemicals Co., Ltd., located in Tokyo, Japan), as a thickening agent, at a weight ratio of 98:2, and a solvent, N-methylpyrrolidone were added to control viscosity so that an amount of solid content in the mixture may be 60 wt %.

By using a conventional method, two surfaces of a copper current collector having a thickness of 15 μm were coated with the negative active material composition. Then, the current collector coated with the negative active material composition was dried at room temperature, dried again and pressed at a temperature of 120° C. to prepare a negative electrode including a first negative active material layer having a thickness of 77 μm, a density of 1.64 g/cc, a loading level of 12.52 mg/cm², and a porosity of 24%, and a second negative active material layer having a thickness of 63 μm, a density of 1.64 g/cc, a loading level of 10.24 mg/cm², and a porosity of 24%, on respective surfaces of the copper current collector.

3) Preparation of Jelly-Roll Type Electrode Structure

A polyethylene (PE) film (available from Toray Battery Separator Film, Nasu-Shiobara, Japan) having a thickness of 16 μm was prepared as a separator. Then, the separator was disposed both between the second positive active material layer and the first negative active material layer and on an outer surface of the second negative active material layer, and then a structure having the positive electrode prepared above, the separator, the negative electrode prepared above, and the separator that are sequentially stacked (the first positive active material layer/Al/second positive active material layer/separator/first negative active material layer/Cu/second negative active material layer/separator) was wound to prepare a jelly-roll type electrode structure.

4) Preparation of Lithium Secondary Battery

The electrode structure prepared above was accommodated in a box-shaped case, and an electrolyte including a mixture solvent prepared by mixing ethylene carbonate (EC), ethylmethyl carbonate (EMC), and dimethyl carbonate (DMC), at a volume ratio of 1:1:1 and 1.3 M $LiPF_6$ as a lithium salt, was injected into the case to prepare a lithium secondary battery of a box type.

Example 2

A lithium secondary battery was prepared in the same manner used in Example 1, except that a positive electrode including a first positive active material layer having a thickness of 47 μm, a density of 3.96 g/cc, a loading level of 18.73 mg/cm², and a porosity of 19%, and a second positive active material layer having a thickness of 71 μm, a density of 3.96 g/cc, a loading level of 28.09 mg/cm², and a porosity of 19%, formed on respective surfaces of the aluminum current collector, and a negative electrode including a first negative active material layer having a thickness of 84 μm, a density of 1.64 g/cc, a loading level of 13.66 mg/cm², and a porosity of 24%, and a second negative active material layer having a thickness of 56 μm, a density of 1.64 g/cc, a loading level of 9.10 mg/cm², and a porosity of 24%, formed on respective surfaces of the copper current collector were prepared.

Example 3

A lithium secondary battery was prepared in the same manner used in Example 1, except that a positive electrode including a first positive active material layer having a thickness of 36 μm, a density of 3.96 g/cc, a loading level of 14.41 mg/cm², and a porosity of 19%, and a second positive active material layer having a thickness of 82 μm, a density of 3.96 g/cc, a loading level of 32.41 mg/cm², and a porosity of 19%, formed on respective surfaces of the aluminum current collector, and a negative electrode including a first negative active material layer having a thickness of 97 μm, a density of 1.64 g/cc, a loading level of 15.76 mg/cm², and a porosity of 24%, and a second negative active material layer having a thickness of 43 μm, a density of 1.64 g/cc, a loading level of 7 mg/cm², and a porosity of 24%, formed on respective surfaces of the copper current collector were prepared.

Example 4

A lithium secondary battery was prepared in the same manner used in Example 1, except that a positive electrode including a first positive active material layer having a thickness of 30 μm, a density of 3.96 g/cc, a loading level of 11.91 mg/cm², and a porosity of 19%, and a second positive active material layer having a thickness of 88 μm, a density of 3.96 g/cc, a loading level of 34.91 mg/cm², and a porosity of 19%, formed on respective surfaces of the aluminum current collector, and a negative electrode including a first negative active material layer having a thickness of 104 μm, a density of 1.64 g/cc, a loading level of 16.97 mg/cm², and a porosity of 24%, and a second negative active material layer having a thickness of 36 μm, a density of 1.64 g/cc, a loading level of 5.79 mg/cm², and a porosity of 24%, formed on respective surfaces of the copper current collector were prepared.

Example 5

A lithium secondary battery was prepared in the same manner used in Example 1, except that a positive electrode including a first positive active material layer having a thickness of 24 μm, a density of 3.96 g/cc, a loading level of 9.36 mg/cm², and a porosity of 19%, and a second positive active material layer having a thickness of 94 μm, a density of 3.96 g/cc, a loading level of 37.46 mg/cm², and a porosity of 19%, formed on respective surfaces of the aluminum current collector, and a negative electrode including a first negative active material layer having a thickness of 112 μm, a density of 1.64 g/cc, a loading level of 18.21 mg/cm², and a porosity of 24%, and a second negative active material layer having a thickness of 28 μm, a density of 1.64 g/cc, a loading level of 4.55 mg/cm², and a porosity of 24%, formed on respective surfaces of the copper current collector were prepared.

Example 6

A lithium secondary battery was prepared in the same manner used in Example 1, except that a positive electrode including a first positive active material layer having a porosity of 19%, and a second positive active material layer having a porosity of 24%, formed on respective surfaces of the aluminum current collector, and a negative electrode including a first negative active material layer having a porosity of 29%, and a second negative active material layer having a porosity of 24%, formed on respective surfaces of the copper current collector were prepared by using a press-roll having two surfaces at different respective temperatures so that the first and second positive active material or negative active material layers may be pressed at different degrees.

Example 7

A lithium secondary battery was prepared in the same manner used in Example 2, except that a positive electrode including a first positive active material layer having a porosity of 19%, and a second positive active material layer having a porosity of 29%, formed on respective surfaces of the aluminum current collector, and a negative electrode including a first negative active material layer having a porosity of 34%, and a second negative active material layer having a porosity of 24%, formed on respective surfaces of the copper current collector were prepared by using a press-roll having two surfaces at different respective temperatures so that the first and second positive active material or negative active material layers may be pressed at different degrees.

Example 8

A lithium secondary battery was prepared in the same manner used in Example 3, except that a positive electrode including a first positive active material layer having a porosity of 19%, and a second positive active material layer having a porosity of 34%, formed on respective surfaces of the aluminum current collector, and a negative electrode including a first negative active material layer having a porosity of 39%, and a second negative active material layer having a porosity of 24%, formed on respective surfaces of the copper current collector were prepared by using a press-roll having two surfaces at different respective temperatures so that the first and second positive active material or negative active material layers may be pressed at different degrees.

Example 9

A lithium secondary battery was prepared in the same manner used in Example 4, except that a positive electrode including a first positive active material layer having a porosity of 15%, and a second positive active material layer having a porosity of 29%, formed on respective surfaces of the aluminum current collector, and a negative electrode including a first negative active material layer having a porosity of 34%, and a second negative active material layer having a porosity of 19%, formed on respective surfaces of the copper current collector were prepared by using a press-roll having two surfaces at different respective temperatures so that the first and second positive active material or negative active material layers may be pressed at different degrees.

Example 10

A lithium secondary battery was prepared in the same manner used in Example 5, except that a positive electrode including a first positive active material layer having a porosity of 15%, and a second positive active material layer having a porosity of 34%, formed on respective surfaces of the aluminum current collector and a negative electrode including a first negative active material layer having a porosity of 39%, and a second negative active material layer having a porosity of 19%, formed on respective surfaces of the copper current collector were prepared by using a press-roll having two surfaces at different temperatures so that the first and second positive active material or negative active material layers may be pressed at different degrees.

Comparative Example 1 (Preparation of Battery Including Active Material Layers Having the Same Loading Level on Two Surfaces of Current Collector)

A lithium secondary battery was prepared in the same manner used in Example 1, except that a positive electrode including a positive active material layer having a thickness of 59 μm, a density of 3.96 g/cc, a loading level of 23.41 mg/cm$^2$, and a porosity of 19% formed on each of the surfaces of the aluminum current collector and a negative electrode including a negative active material layer having a thickness of 70 μm, a density of 1.64 g/cc, a loading level of 11.38 mg/cm$^2$, and a porosity of 24% formed on each of the surfaces of the copper current collector were prepared.

Comparative Example 2 (Preparation of Battery that is Wound While Positive Active Material Layer Having High Loading Level and Negative Active Material Layer Having Low Loading Level Face Each Other)

A lithium secondary battery was prepared in the same manner used in Example 1, except that, the separator was disposed both between the first positive active material layer and the firstnegative active material layer and on an outer surface of the second negative active material layer, and a structure having the positive electrode prepared above, the separator, the negative electrode prepared above, and the separator that are sequentially stacked (the second positive active material layer/Al/first positive active material layer/separator/first negative active material layer/Cu/second negative active material layer/separator) was wound to prepare a jelly-roll type electrode structure.

Comparative Example 3 (Preparation of Battery when Asymmetry Ratio of Loading Levels of Positive Electrode and Negative Electrode are Different)

A lithium secondary battery was prepared in the same manner used in Example 1, except that the negative electrode prepared in Example 5 was used as the negative electrode of Example 1.

Evaluation Example 1 (Measurement of Battery Resistance)

Resistances of the lithium secondary batteries prepared in Examples 1 to 10 and Comparative Examples 1 to 3 were measured at 50% of a state of charge (SOC), and the results are shown in Table 1.

TABLE 1

|  | Loading level of second positive active material layer/loading level of first positive active material layer | Loading level of first negative active material layer/loading level of second negative active material layer | Porosity of second positive active material layer/porosity of first positive active material layer | Porosity of first negative active material layer/porosity of second negative active material layer | Battery resistance (ohm) |
|---|---|---|---|---|---|
| Example 1 | 1.22 | 1.22 | 1 | 1 | 0.35 |
| Example 2 | 1.50 | 1.50 | 1 | 1 | 0.34 |
| Example 3 | 2.25 | 2.25 | 1 | 1 | 0.32 |
| Example 4 | 2.93 | 2.93 | 1 | 1 | 0.33 |
| Example 5 | 4.00 | 4.00 | 1 | 1 | 0.38 |
| Example 6 | 1.22 | 1.22 | 1.26 | 1.21 | 0.31 |
| Example 7 | 1.50 | 1.50 | 1.37 | 1.42 | 0.32 |
| Example 8 | 2.25 | 2.25 | 1.79 | 1.63 | 0.31 |
| Example 9 | 2.93 | 2.93 | 1.93 | 1.79 | 0.32 |
| Example 10 | 4.00 | 4.00 | 2.27 | 2.05 | 0.37 |
| Comparative Example 1 | 1 | 1 | 1 | 1 | 0.39 |
| Comparative Example 2 | 1.22 | 1.22 | 1 | 1 | 0.62 |
| Comparative Example 3 | 1.22 | 4.00 | 1 | 1 | 0.48 |

As shown in Table 1, battery resistances of the lithium secondary batteries having different loading levels on the two surfaces of the current collector prepared in Examples 1 to 10 are lower than that of the lithium secondary battery having the same loading level on the two surfaces of the current collector prepared in Comparative Example 1. The results confirm that an electrode may have a high output by lowering a battery resistance without a change in the total thickness of the electrode.

Also, the battery prepared in Comparative Example 2 in which a positive active material layer having a high loading level faces a negative active material layer having a low loading level and the battery prepared in Comparative Example 3 which has an asymmetry ratio of loading levels of the positive electrode and the negative electrode may have high battery resistances due to the imbalance between the positive electrode and the negative electrode facing each other.

Evaluation Example 2 (High Rate Characteristics Evaluation)

The lithium batteries prepared in Examples 1 to 10 and Comparative Examples 1 to 3 were charged at a 0.05 C rate to a cut-off voltage of 4.35 V in CC (constant current) mode, and then were discharged at a 0.2 C rate to a discharge cut-off voltage of 2.75 V. Then, a discharging rate was changed to 1.0 C and 3.0 C to measure a discharge capacity per C-rate. The results are shown in Table 2 and FIG. 6.

Figure 6:
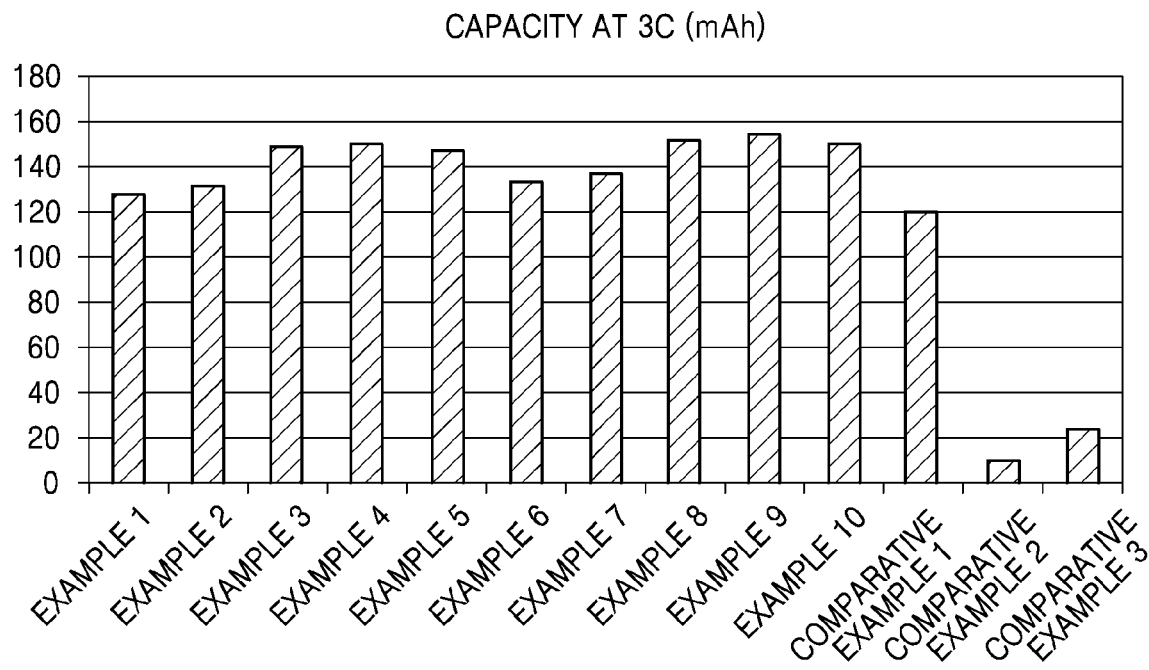
FIG. 6 is a graph of a capacity of batteries prepared in Examples 1 to 10 and Comparative Examples 1 to 3 at 3C.

As shown in Table 2 and FIG. 6, a 1.0 C-rate capacity retention ratio of the batteries prepared in Examples 1 to 5 having different loading levels on the two surfaces of the current collector is not much different from that of the battery prepared in Comparative Example 1 which has the same loading level on the two surfaces of the current collector, but a 3.0 C-rate discharge capacity of the batteries prepared in Examples 1 to 5 were significantly improved compared to that of the battery prepared in Comparative Example 1. This indicates an increase in a battery capacity per time for driving, and thus it is confirmed that output characteristics of the battery are improved.

Also, it may be confirmed that the batteries prepared in Examples 6 to 10, in which the active materials of the two surfaces of the current collector have different porosities as well as different loading levels, have a 3.0 C-rate discharging capacity that is improved than that of the batteries prepared in Examples 1 to 5, in which the active materials of the two surfaces of the current collector have different loading levels only. This is because rate characteristics are improved due to low resistances.

On the other hand, the battery prepared in Comparative Example 2, in which the positive active material layer having a high loading level faces the negative active material layer having a low loading level and the battery prepared in Comparative Example 3, in which an asymmetry ratio of loading levels of the positive electrode and the negative electrode have a very low discharge capacity at 3.0 C.

Evaluation Example 3 (Life Characteristic Evaluation at High Rate)

The lithium secondary batteries prepared in Examples 1 to 10 and Comparative Examples 1 to 3 were charged at a 1.0 C rate to a voltage of 4.3 V in a CC mode at a temperature of 25° C., and the batteries were discharged at a 1.0 C rate to a voltage of 2.5 V in a CC mode. Subsequently, A cycle of the charging and the discharging was repeatedly performed 50 times.

Figure 7:
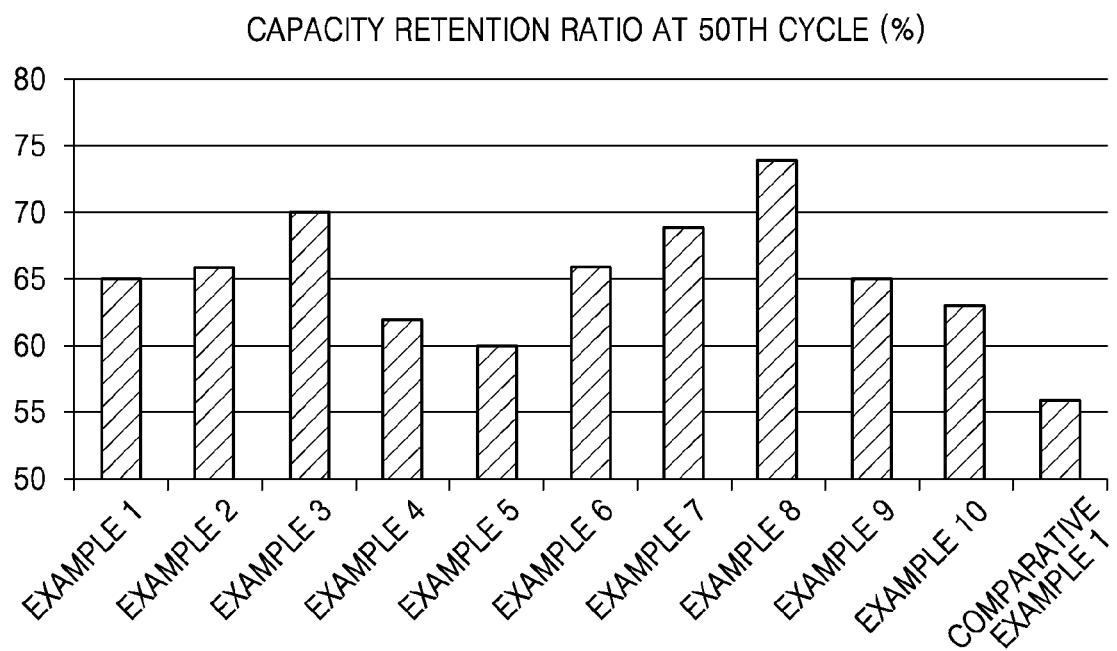
FIG. 7 is a graph of a capacity retention rate of batteries prepared in Examples 1 to 10 and Comparative Example 1 at $50^{th}$ cycle.

Capacity retention rates (CRRs) of the batteries were measured and are shown in Table 2 and FIG. 7. Here, a capacity retention ratio is defined by Equation 1 below:

Capacity retention ratio [%]=[a discharge capacity at each cycle/a discharge capacity at a first cycle]× 100   <Equation 1>

TABLE 2

|  | Rate characteristics | | High rate life characteristics Capacity retention rate at 50$^{th}$ cycle (%) |
|---|---|---|---|
|  | 1 C discharge capacity (mAh) | 3 C discharge capacity (mAh) | |
| Example 1 | 361 | 128 | 65 |
| Example 2 | 360 | 132 | 66 |
| Example 3 | 357 | 150 | 70 |
| Example 4 | 350 | 151 | 62 |

TABLE 2-continued

| | Rate characteristics | | High rate life characteristics Capacity retention rate at 50<sup>th</sup> cycle (%) |
|---|---|---|---|
| | 1 C discharge capacity (mAh) | 3 C discharge capacity (mAh) | |
| Example 5 | 346 | 148 | 60 |
| Example 6 | 361 | 133 | 66 |
| Example 7 | 360 | 138 | 69 |
| Example 8 | 360 | 153 | 74 |
| Example 9 | 356 | 155 | 65 |
| Example 10 | 355 | 151 | 63 |
| Comparative Example 1 | 360 | 120 | 56 |
| Comparative Example 2 | 100 | 10 | Not measurable as a residual capacity is almost none |
| Comparative Example 3 | 150 | 25 | Not measurable as a residual capacity is almost none |

As shown in Table 2 and FIG. 7, the batteries prepared in Examples 1 to 10 have improved capacity retention ratio at a high rate speed compared to that of the battery prepared in Comparative Example 1. This may be resulted by reduction in resistance and stabilization of an N/P ratio.

In particular, a loading level ratio of the second positive active material layer to the first positive active material layer and a loading level ratio of the first negative active material layer to the second negative active material layer is within a range of about 1.1 to about 2.5 (Examples 1 to 3 and Examples 6 to 8), life characteristics of the batteries improved.

In addition, it may be confirmed that the batteries prepared in Examples 6 to 10, in which the active materials on the two surfaces of the current collector have different porosities as well as different loading levels, have improved life characteristics than the batteries prepared in Examples 1 to 5, in which the active materials on the two surfaces of the current collector have different loading levels only.

On the other hand, the battery prepared in Comparative Example 2, in which the positive active material layer having a high loading level faces the negative active material layer having a low loading level and a battery prepared in Comparative Example 3, in which a asymmetry ratio of loading levels of the positive electrode and the negative electrode are different had degraded life characteristics at a high rate. This was resulted because an N/P ratio was not stable.

As described above, according to the one or more of the above embodiments of the present invention, an electrode structure includes an asymmetrical negative electrode and an asymmetrical positive electrode including active material layers that have different loading levels on two surfaces of a current collector, and thus a resistance of an electrode may decrease to improve rate characteristics and life characteristics of a lithium battery.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims.

What is claimed is:

1. An electrode structure for a lithium battery, the electrode structure comprising:
a positive electrode;
a negative electrode; and
a first separator disposed between the positive electrode and the negative electrode,
wherein the positive electrode comprises a positive electrode current collector; a first positive active material layer of the lithium battery disposed on a first surface of the positive electrode current collector; and a second positive active material layer of the lithium battery disposed on a second surface of the positive electrode current collector,
wherein the negative electrode comprises a continuous negative electrode current collector; a first negative active material layer of the lithium battery disposed on a first surface of the negative electrode current collector; and a second negative active material layer of the lithium battery disposed on a second surface of the negative electrode current collector,
wherein the first positive active material layer and the second positive active material layer comprise the same positive active material while having different loading levels, and wherein the first negative active material layer and the second negative active material layer comprise the same negative active material while having different loading levels,
wherein a loading level of the second positive active material layer in the electrode structure is uniformly higher than a loading level of the first positive active material layer across the entire area of the first and second positive active material layers, a loading level of the first negative active material layer is uniformly higher than a loading level of the second negative active material layer across the entire area of the first and second negative active material layers,
wherein a ratio of the loading level of the second positive active material layer to the loading level of the first positive active material layer is in a range of higher than 1 to about 4 or lower, and a ratio of the loading level of the first negative active material layer to the loading level of the second negative active material layer is in a range of higher than 1 to about 4 or lower,
wherein the second positive active material layer having the loading level that is higher than the loading level of the first positive active material layer faces the first negative active material layer having the loading level that is higher than the loading level of the second negative active material layer, and
wherein the second positive active material layer and the first negative active material layer are disposed near the first separator located therebetween such that only the first separator is located between the second positive active material layer and the first negative active material layer.

2. The electrode structure of claim 1 further comprising a second separator that is disposed on an outer surface of at least one selected from the first positive active material layer and the second negative active material layer.

3. The electrode structure of claim 1, wherein the electrode structure is a jelly-roll or a stack.

4. The electrode structure of claim 1, wherein a ratio of a loading level of the second positive active material layer to a loading level of the first positive active material layer is in a range of about 1.1 to about 2.5, and a ratio of a loading level of the first negative active material to a loading level of the second negative active material layer is in a range of about 1.1 to about 2.5.

5. The electrode structure of claim 1, wherein a ratio of the loading level of the second positive active material layer to the loading level of the first positive active material layer is equal to a ratio of the loading level of the first negative active material layer to the loading level of the second negative active material layer.

6. The electrode structure of claim 1, wherein the loading level of the first positive active material layer is in a range of about 4 mg/cm² to about 40 mg/cm², and the loading level of the second negative active material layer is in a range of about 2 mg/cm² to about 20 mg/cm².

7. The electrode structure of claim 1, wherein a density of the first positive active material layer is equal to a density of the second positive active material layer and a thickness of the second positive active material layer is greater than a thickness of the first positive active material layer.

8. The electrode structure of claim 7, wherein the density of each of the first positive active material layer and the density of the second positive active material layer are in a range of about 3.0 g/cc to about 4.2 g/cc, a thickness of the first positive active material layer is in a range of about 10 µm to about 110 µm, and a thickness of the second positive active material layer is greater than 1 to about 4 or less times as thick as the thickness of the first positive active material layer.

9. The electrode structure of claim 1, wherein a density of the first negative active material layer is equal to a density of the second negative active material layer, and a thickness of the first negative active material is greater than a thickness of the second negative active material layer.

10. The electrode structure of claim 9, wherein the density of each of the first positive active material layer and the density of the second positive active material layer are in a range of about 1.3 g/cc to about 1.8 g/cc, the thickness of the second negative active material layer is in a range of about 15 µm to about 130 µm, and the thickness of the first negative active material layer is greater than 1 to about 4 or less times as thick as the thickness of the second negative active material layer.

11. The electrode structure of claim 1, wherein a thickness of the first positive active material layer is equal to a thickness of the second positive active material layer, a density of the second positive active material layer is higher than a density of the first positive active material layer, a thickness of the first negative active material layer is equal to a thickness of the second negative active material layer, and a density of the first negative active material layer is higher than a density of the second negative active material layer.

12. A lithium battery comprising the electrode structure of claim 1.

13. The lithium battery of claim 12, wherein the first and second positive active material layers have the same chemical composition while having different thicknesses and/or different densities, and wherein the first and second negative active material layers have the same chemical composition while having different thicknesses and/or densities.

14. The lithium battery of claim 13, wherein the lithium battery is configured to generate electrical energy by oxidation and reduction reactions involving lithium ions that are intercalated into and deintercalated out of the first and second positive active material layers and the first and second negative active material layers.

15. An electrode structure for a lithium battery, the electrode structure comprising:
a positive electrode;
a negative electrode; and
a first separator disposed between the positive electrode and the negative electrode,
wherein the positive electrode comprises a positive electrode current collector; a first positive active material layer of the lithium battery disposed on a first surface of the positive electrode current collector; and a second positive active material layer of the lithium battery disposed on a second surface of the positive electrode current collector,
wherein the negative electrode comprises a continuous negative electrode current collector; a first negative active material layer of the lithium battery disposed on a first surface of the negative electrode current collector; and a second negative active material layer of the lithium battery disposed on a second surface of the negative electrode current collector,
wherein the first positive active material layer and the second positive active material layer comprise the same positive active material while having different loading levels, and wherein the first negative active material layer and the second negative active material layer comprise the same negative active material while having different loading levels,
wherein a loading level of the second positive active material layer in the electrode structure is uniformly higher than a loading level of the first positive active material layer across the entire area of the first and second positive active material layers, a loading level of the first negative active material layer is uniformly higher than a loading level of the second negative active material layer across the entire area of the first and second negative active material layers,
wherein a ratio of the loading level of the second positive active material layer to the loading level of the first positive active material layer is in a range of higher than 1 to about 4 or lower, and a ratio of the loading level of the first negative active material layer to the loading level of the second negative active material layer is in a range of higher than 1 to about 4 or lower,
the second positive active material layer and the first negative active material layer are disposed near the first separator located therebetween such that only the first separator is located between the second positive active material layer and the first negative active material layer, and
wherein a porosity of the second positive active material layer and a porosity of the first positive active material layer are different from each other, and a porosity of the first negative active material layer and a porosity of the second negative active material layer are different from each other.

16. The electrode structure of claim 15, wherein the porosity of the second positive active material layer is greater than the porosity of the first positive active material layer and the porosity of the first negative active material layer is greater than the porosity of the second negative active material layer.

17. The electrode structure of claim 16, wherein a ratio of the porosity of the second positive active material layer to the porosity of the first positive active material layer is in a range of about 1.1 to about 2.3, and a ratio of the porosity of the first negative active material layer to the porosity of the second negative active material layer is in a range of about 1.1 to about 2.3.

18. The electrode structure of claim 16, wherein a ratio of the porosity of the second positive active material layer to the porosity of the first positive active material layer is equal to the ratio of the porosity of the first negative active material layer to the porosity of the second negative active material.

19. The electrode structure of claim 16, wherein the porosity of the first positive active material is in a range of about 15% to about 40%, and the porosity of the second negative active material layer is in a range of about 15% to about 40%.

* * * * *